United States Patent

[11] 3,575,551

[72] Inventor Robert W. Krug
Janesville, Wis.

[21] Appl. No. 730,108
[22] Filed May 17, 1968
[45] Patented Apr. 20, 1971
[73] Assignee Zenith Radio Corporation

[54] CHROMINANCE DEMODULATOR BLANKING CIRCUIT
4 Claims, 2 Drawing Figs.

[52] U.S. Cl. .......... 178/54, 178/7.5
[51] Int. Cl. .......... H04n 9/50, H04n 5/44
[50] Field of Search .......... 178/7.3 (DC), 7.5 (DC), 5.4 (SD), 5.4 (M), 5.4

[56] References Cited
UNITED STATES PATENTS

| | | | |
|---|---|---|---|
| 3,492,414 | 1/1970 | Chua et al. | 178/5.4 |
| 3,113,177 | 12/1963 | Carnt et al. | 178/5.4 |
| 3,251,931 | 5/1966 | Jobe et al. | 178/5.4 |

*Primary Examiner*—Richard Murray
*Assistant Examiner*—John C. Martin
*Attorneys*—John J. Pederson and Eugene M. Cummings

ABSTRACT: A clamping circuit for establishing a DC reference level in each of the three matrix amplifier triodes of an AC-coupled active-matrix type chrominance demodulator. A single transistor shunt-connected across the common cathode resistor of the triodes impresses negative-polarity retrace-interval pulses on their cathodes, causing them to conduct heavily during each retrace interval and charge their respective grid coupling capacitors to predetermined DC reference levels. The transistor derives its operating power from the quiescent cathode current drawn by the triodes through the common cathode resistor and does not require ancillary power supply or coupling circuitry. The circuit further provides horizontal and vertical retrace blanking to the receiver image reproducer, and in an alternate embodiment the base-emitter junction of the transistor is utilized to develop a DC control potential for the receiver high voltage regulator circuitry.

Inventor
Robert W. Krug
By Eugene M. Cummings
Agent

Inventor
Robert W. Krug
By Eugene M. Cummings
Agent

CHROMINANCE DEMODULATOR BLANKING CIRCUIT

BACKGROUND OF THE INVENTION

The present invention relates to improvements in color television receivers and more particularly, to an improved clamping circuit for use in the chrominance demodulator of such a receiver.

In accordance with present United States standards governing color television transmissions, luminance information, representing elemental brightness variations in the televised image, is transmitted on an amplitude-modulated main carrier component and chrominance information, representing color hue and saturation variations, is transmitted on a phase- and amplitude-modulated 3.58 MHz subcarrier component. At the receiver the luminance component is demodulated by a conventional AM video detector, amplified and applied to the three cathodes of the receiver image reproducer, which in present practice takes the form of a three gun tricolor shadow-mask cathode-ray tube. The chrominance component is demodulated in a chrominance demodulator stage by synchronous detection, whereby three separate color-control signals in the form of R–Y, B–Y and G–Y are obtained for application to the red, blue and green guns of the image reproducer, respectively. Although these control signals could be derived directly from the subcarrier by means of three separate synchronous detectors, for a number of reasons including circuit economy it has become standard practice to utilize two synchronous detectors operating at demodulation axes other than the red, blue and green axes. The output signals from these detectors, categorically referred to as X and Z signals, are then applied to a matrix amplifier stage wherein they are matrixed to obtain the desired R–Y, B–Y and G–Y color control signals for the receiver image reproducer. The matrix amplifier stage preferably comprises three triode amplifiers sharing a common cathode impedance, as explained in U.S. Pat. No. 3,180,928, issued to John L. Rennick and assigned to the present assignee.

For optimum color fidelity it is necessary that the X and Z synchronous detectors be direct-current (DC) coupled to the image reproducer. Since in practical circuits the *B* +voltage required on the anodes of the detectors precludes direct DC coupling to the control grids of the matrix amplifiers, it has become common practice to incorporate in such chrominance demodulators clamping circuits for establishing DC reference levels in each of the amplifiers. Such clamping circuits generally function to apply negative-polarity retrace-interval pulses across the common cathode impedance, causing each of the triode amplifiers to periodically draw grid current and charge their associated grid coupling capacitors to a predetermined DC level. Furthermore, such clamping circuits may perform one or more additional functions such as providing retrace blanking to the image reproducer or developing a control signal for use in regulating the accelerating potential applied to the image reproducer. Prior art clamping circuits, which employed a vacuum tube amplifier for amplifying the horizontal-rate pulses to a level suitable for application to the common cathode impedance, were unnecessarily complicated and expensive because of the ancillary circuitry required to supply operating power to the vacuum tube and to couple the amplified pulse to the common impedance.

SUMMARY OF THE INVENTION

Accordingly, it is a general object of the invention to provide a new and improved and more economical chrominance demodulator for use in a color television receiver.

It is a specific object of the invention to provide in an AC coupled chrominance demodulator economical means for establishing a DC reference level.

It is a more specific object of the invention to provide in an AC coupled chrominance demodulator means for establishing a DC reference level which means does not require ancillary circuitry for obtaining operating power.

It is another more specific object of the invention to provide in AC coupled chrominance demodulator means not requiring ancillary power supply circuitry for establishing a DC reference level, for blanking the receiver image reproducer during retrace intervals, and for developing a DC control signal suitable for use in regulating the high voltage applied to the image reproducer.

In accordance with the invention, a new and improved chrominance demodulator is provided for a television reciever having a source of composite chrominance signals, sources of horizontal-rate and vertical-rate retrace-interval pulses, a color image reproducer operable from first, second and third color-control signals, and a plane of reference potential. The demodulator comprises a pair of synchronous detectors for deriving first and second color-information signals from the composite chrominance signal. It further comprises a matrixing impedance, and means AC coupled to the synchronous detecting means and comprising first, second and third matrix amplifier devices for selectively combining the first and second color-information signals to produce the first, second and third color-control signals for the image reproducer, each of the devices having an input electrode and an associated input circuit including a capacitor, an output electrode DC coupled to the image reproducer, and a common electrode returned to the plane of reference potential through the matrixing impedance. Means are included for establishing between the output and common electrodes of the matrix amplifier devices and through the matrixing impedance a quiescent operating current, the quiescent current developing across the matrixing impedance a source of direct current. Means comprising a solid-state amplifying device operable from the developed direct current source and having an input electrode coupled to the source of horizontal-rate retrace-interval pulses, an output electrode coupled to one end terminal of the matrixing impedance, and a common electrode coupled to the remaining end terminal of the matrixing impedance, are included for deriving operating power therefrom and for impressing the horizontal-rate pulses thereacross to cause the matrix amplifiers to conduct and charge their respective input circuit capacitors during horizontal retrace intervals to establish DC reference levels in said devices and to provide horizontal retrace-blanking to said image reproducer.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several FIGS. of which like reference numerals identify like elements, and in which:

DESCRIPTION OF THE PREFERRED EMBODIMENT

Figure 1:
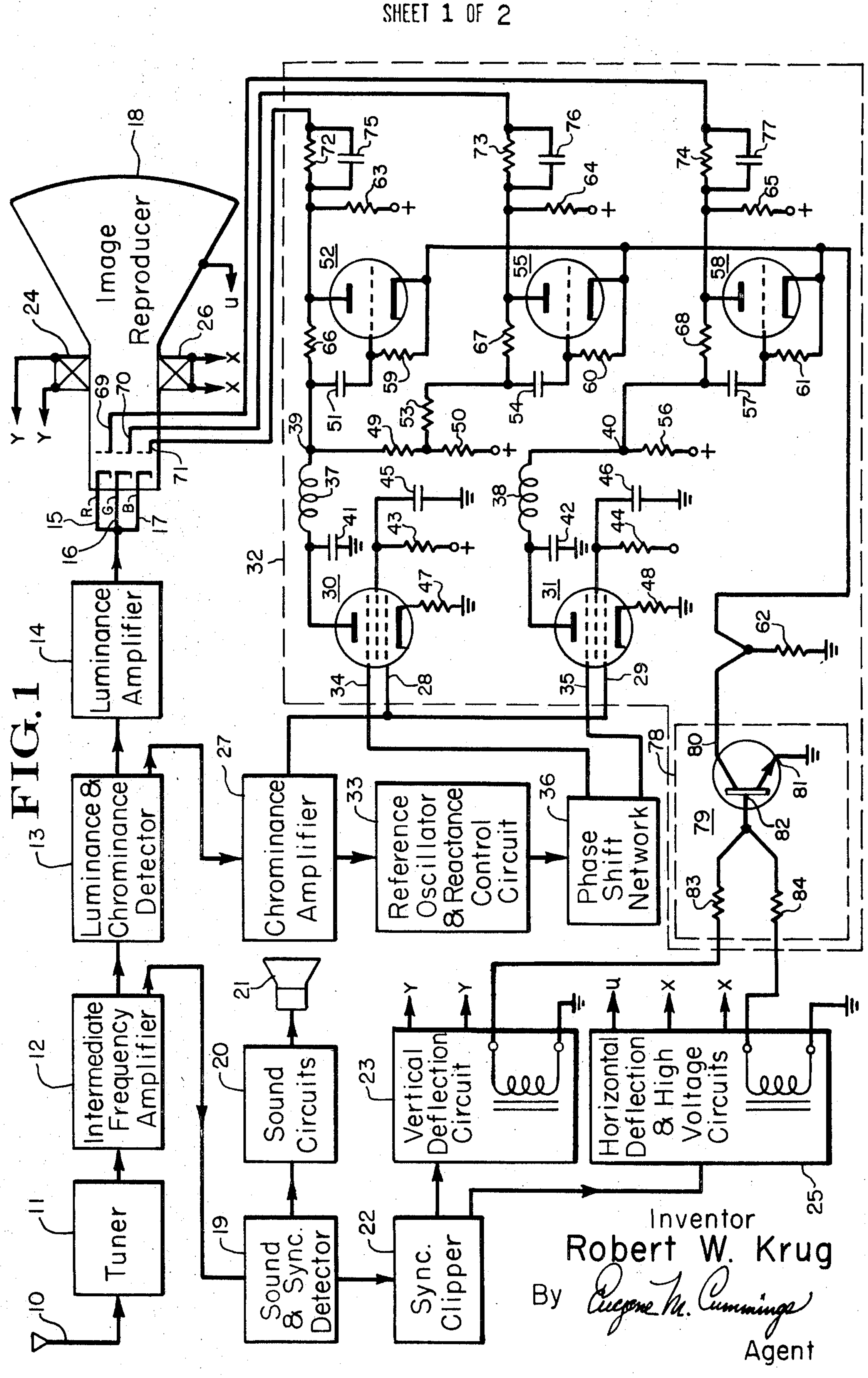
FIG. 1 a block diagram, partially schematic, of a television receiver having a chrominance demodulator incorporating a clamping circuit constructed in accordance with a preferred embodiment of the invention.

With the exception of certain detailed circuitry in the color demodulator system, the receiver of FIG. 1 is essentially conventional in design and accordingly only a brief description of its structure and operation need be given here. A received signal is intercepted by an antenna 10 and coupled in a conventional manner to a tuner 11, which includes the usual radio frequency amplifying and heterodyning stages for translating the signal to an intermediate frequency. After amplification by an intermediate-frequency amplifier 12 the signal is applied to a luminance and chrominance detector 13 wherein luminance and chrominance information in the form of a composite video signal is derived. The luminance component of the composite signal is amplified in a luminance amplifier 14 and applied to the red, green and blue cathodes, 15, 16 and 17, respectively, of an image reproducer 18.

The output of intermediate-frequency amplifier 12 is also applied to a sound and sync detector 19, wherein a second composite video-frequency signal is derived which includes both sound and synchronizing components. The sound components are applied to sound circuits 20, wherein conventional sound demodulation and amplification circuitry develops an audio output signal suitable for driving a speaker 21.

Synchronizing information, in the form of vertical and horizontal sync pulses, is separated from the composite signal by a sync clipper 22. A vertical deflection circuit 23 utilizes the separated vertical sync pulses to generate a synchronized vertical-rate sawtooth scanning signal in a vertical deflection winding 24. The horizontal sync pulses from sync clipper 20 are applied to horizontal deflection and high voltage circuits 25, which stage includes conventional reaction-scanning circuitry for utilizing these pulses to generate synchronized horizontal-rate sawtooth canning current in a horizontal deflection winding 26 and high voltage DC accelerating potential for the ultor electrode $\mu$ of image reproducer 18. Because of the inherently poor regulation of such reaction-scanning power supplies, stage 25 normally includes voltage-regulator circuitry for varying the generated accelerating potential as a function of an externally applied control effect. This voltage-regulator circuitry, which may take the form of a variable shunt-connected load or a variable grid bias network for controlling the conduction angle of the horizontal output tube, when combined with suitable voltage sensing means maintains the accelerating potential applied to the image reproducer substantially constant in the face of brightness variations in the reproduced image.

The chrominance component of the composite video-frequency output signal of luminance and chrominance detector 13 is applied to a chrominance amplifier 27. The amplified chrominance signal from this stage is concurrently applied to the control grids 28 and 29 of pentodes 30 and 31, respectively, which comprise part of the receiver chrominance demodulator 32 and function as synchronous detectors at first and second demodulation axes, denoted Z and X respectively. The output of chrominance amplifier 27 is further applied to a reference oscillator and reactance control circuit 33, wherein suitable gating and phase comparison circuitry is utilized to generate a 3.58 MHz. continuous-wave demodulation signal synchronized in phase and frequency to a reference burst contained in the received chrominance composite signal. The demodulation signal is applied to the suppressor grids 34 and 35 of synchronous detectors 30 and 31, respectively, at first and second different predetermined phases by means of a phase shift network 36.

The functioning of demodulator 32 is fully described in a copending U.S. Pat. application of the present applicant, Ser. No. 627,685, filed Apr. 3, 1967, and assigned to the present assignee. Basically, the phase relationship between the continuous-wave demodulation signals applied to suppressor grids 34, 35 and the composite chrominance signal applied to control grids 28, 29 causes synchronous detectors 30, 31 to develop at their anodes Z and X color-information signals, respectively. The X and Z color-information signals are coupled via inductances 37 and 38 to junctures 39 and 40, which are connected to *B*+ by the respective anode load impedances of pentodes 30 and 31. Capacitors 41 and 42 cooperate with inductances 37 and 38 to form 3.58 MHz. filters for preventing the continuous-wave demodulation signals from also being coupled to junctures 39 and 40. Resistors 43 and 44 serve as screen dropping resistors for applying direct current to the screen grids of pentodes 30 and 31, and capacitors 45 and 46 serve to bypass these grids to ground. Resistors 47 and 48 are conventional cathode resistors which provide operating bias to the pentodes.

The Z axis color-information signal developed by pentode 30 appears across the anode load impedance of that tube, which comprises the series combination of resistors 49 and 50. The entire Z axis signal is coupled by a capacitor 51 to the input electrode, or control grid, of a first matrix amplifier device, triode 52, and a portion of this signal, derived at the juncture of resistors 49 and 50, is coupled through a resistor 53 and a coupling capacitor 54 to the control grid of a second matrix amplifier triode 55. Likewise, the X axis color-information signal derived by pentode 31 appears across the anode load impedance of that tube, resistor 56, and is coupled by a capacitor 57 to the control grid of a third matrix amplifier triode 58. Resistors 59, 60 and 61 serve as grid resistors to establish direct current paths between the control grids of triodes 52, 55 and 58 and their respective cathodes.

The common electrodes, or cathodes, of the three matrix amplifiers are connected to a plane of reference potential, ground, by a matrixing impedance in the form of a common cathode resistor 62. By virtue of this resistor, a third color information signal representing the negative vector sum of the desired B–Y, R–Y and G–Y color-control signals is developed and appears at equal amplitudes on the cathodes of each of the three matrix amplifier triodes. By matrixing this signal with a predetermined portion of either the X or Z axis color-information signals, respective ones of the three desired color-control signals are developed in the anode circuits of each of the three matrix amplifiers. Resistors 63, 64 and 65 comprise output load impedances of triodes 52, 55 and 58, respectively, and serve to apply *B*+ operating current to the output electrodes, or anodes, of these amplifiers. The triodes are self-biased by means including the common cathode resistor 62 such that they draw a predetermined quiescent or idling current, which generates a source of DC across that resistor, a fact which will be seen to be taken advantage of by the invention. Resistors 66, 67 and 68 serve to establish negative feedback in their respective amplifiers to improve stability and frequency response.

The B–Y, G–Y and R–Y color-control signals developed on the anodes of triodes 52, 55 and 58 are coupled through individual resistor-capacitor networks to the red, green and blue control grids, 69, 70 and 71, respectively, of image reproducer 18. Resistors 72, 73 and 74 serve to prevent damage to the control grids of image reproducer 18 should they suddenly be raised to *B*+ potential as a result of failure or removal of one of the matrix amplifiers, and capacitors 75, 76 and 77 serve to bypass these resistors as to the color-control signals. For reasons of clarity, certain elements of the image reproducer 18 are not shown, e.g., screen grids and suppressor grids, but these are conventional in design and need not be considered in understanding the functioning of the invention.

As we have said previously, in order that the color-control signals, accurately represent the R–Y, B–Y and G–Y transmitted signals, it is necessary that the X and Z demodulators be DC coupled to the image reproducer, or alternatively, that some means be employed for establishing a reference DC level in each of the matrix amplifiers. The latter approach is taken in the illustrated embodiment for reason of the large disparity of voltage levels existing between the anodes of pentodes 30 and 31 and the control grids of the individual matrix amplifiers. Demodulator 32 incorporates a single-transistor clamping circuit 78 which applies negative-polarity pulses across cathode resistor 62 during each horizontal and vertical retrace period. These pulses drive all three of the matrix amplifier triodes momentarily into conduction, causing them to draw grid current and charge their respective grid coupling capacitors 51, 54 and 57 to a predetermined DC voltage. This establishes a DC reference level at each of the control grids, in spite of the fact that no direct DC path exists between these control grids and the anodes of pentodes 30 and 31. Inasmuch as a constant DC reference level now exists on which the developed color control signals can depend, this clamping action achieves essentially the same end result as conventional coupling. Of course, the outputs of the individual triodes must still be DC coupled to the grids of image reproducer 18, and this is done via resistors 72, 73 and 74. Since the pulses applies to resistor 62 occur during horizontal and vertical retrace intervals, and since they are of negative polarity and as such cause the individual guns of image reproducer 18 to be cut off, clamping circuit 78 also functions to provide vertical and horizontal retrace blanking to prevent retrace lines from being seen in the reproduced image.

Clamping circuit 78 in its preferred embodiment comprises a single amplifying device, transistor 79, having an output electrode, collector 80, connected directly to the common cathode resistor 62 and a common electrode, emitter 81, connected to ground. The input electrode, base 82, of this transistor is connected to the vertical deflection circuits 23 by means of an isolation resistor 83 and to the horizontal deflection and high-voltage circuits 25 by means of an isolation resistor 84. In each case, windings are provided in the respective deflection circuits to provide low-impedance sources of suitable positive-polarity pulses. While it is only necessary to connect to the horizontal deflection system to obtain the desired clamping action, by making connection to the vertical deflection system as well this circuit provides an economical and efficient means for blanking the image reproducer during both horizontal and vertical retrace intervals.

So that the vertical retrace blanking does not interfere with the clamping action of the circuit, it has been found desirable, although not necessary, to apply the vertical-rate pulses to the base at approximately the same or slightly less amplitude than the horizontal-rate pulses, and this is conveniently accomplished by varying the relative values of isolation resistors 83 and 84. It will be appreciated that the vertical-rate pulses are not required for the clamping function, and that therefore the invention can be practiced without the connection to the vertical deflection system.

In operation, horizontal-rate positive-polarity pulses are applied to the base of transistor 79, amplified and inverted, and applied as negative-polarity pulses across the common cathode resistor 62. This effectively reduces the bias on the three interconnected cathodes to almost zero, causing each matrix amplifier triode to conduct heavily, draw grid current, and charge its associated grid coupling capacitor to a predetermined level, thus establishing a DC reference level in each of the respective grid circuits. At the same time, the anodes of the matrix amplifiers become much less positive by virtue of the heavy conduction, instantaneously lowering the voltage at control grids 69, 70, and 74 and hence blanking image reproducer 18 during retrace intervals.

Figure 2:
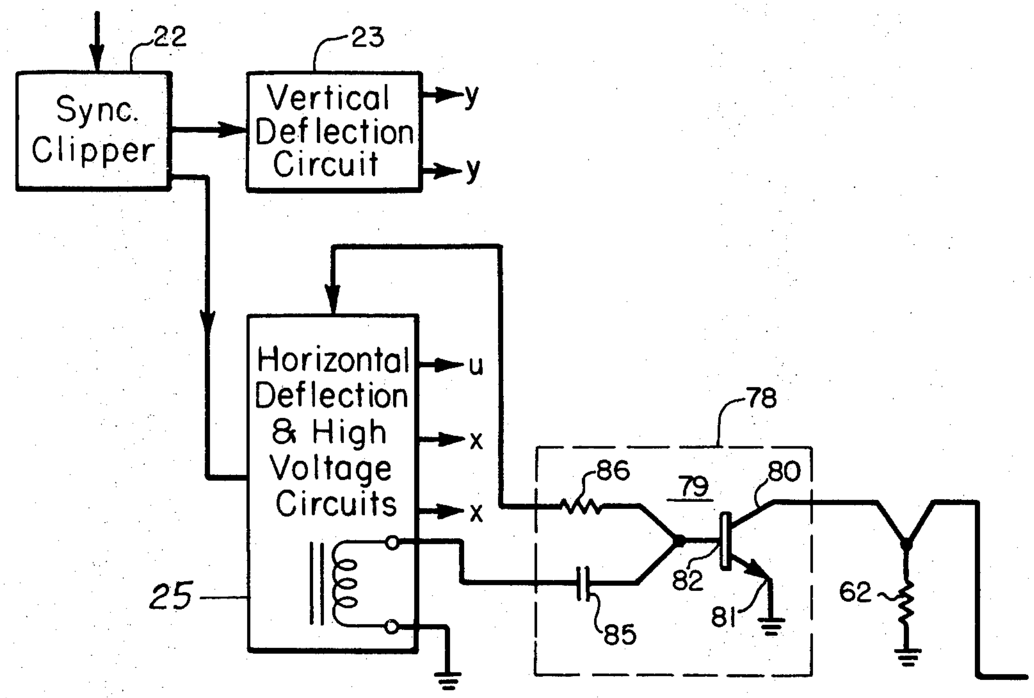
FIG. 2 is a block diagram, partially schematic, of a portion of a television receiver having a chrominance demodulator incorporating a clamping circuit constructed in accordance with an alternate embodiment of the invention.

FIG. 2 shows another embodiment of the invention, in which the base-emitter junction of transistor 79 is utilized as a diode to rectify the horizontal-rate pulses applied to base 82 to develop a DC control signal suitable for controlling the regulator circuitry in stage 25. In this case base 82 is connected by a capacitor 85 to the horizontal-rate pulse source, which may comprise a secondary winding on the flyback transformer associated with the reaction scanning circuitry of the horizontal deflection circuits 25. Base 82 is also connected by an isolation resistor 86 to the regulator circuitry provided in stage 25 for controlling the accelerating potential the output being identified at terminal U which, as indicated, is applied to image reproducer 18 shown in FIG. 1.

In operation, capacitor 85 cooperates with the base-emitter diode of transistor 80 to develop a control effect in the form of a negative DC potential dependent on the amplitude of the applied pulses. Since the amplitude of these pulses is in turn directly related to the accelerating voltage being developed in the high-voltage power supply portion of deflection circuits 25, the potential thus developed is suitable for application to the high-voltage regulator circuitry in circuits 25 to aid in maintaining a constant accelerating potential at image reproducer 18.

In accordance with the invention, transistor 79 requires no external power source, but derives its operating power directly from the DC potential developed across the common cathode resistor 62 as a result of the quiescent cathode current drawn by the three matrix amplifier triodes. This is a significant advantage in that the component cost of the dropping resistors and coupling capacitors usually associated with externally powered stages is eliminated. Furthermore, the use of a single transistor in place of the vacuum tube used in previous clamping circuits results in increased reliability and improved performance.

The invention provides a clamping circuit which requires no external source of operating power, and offers improved reliability and decreased component cost over previous designs. Not only does the circuit provide an efficient means of establishing a DC operating level in each of the matrix amplifiers of an AC coupled chrominance demodulator, but it also provides an efficient means of accomplishing retrace blanking and of obtaining a control potential suitable for controlling the operation of the regulator circuitry usually associated with reaction-scanning type high-voltage power supplies. It will be appreciated that the illustrated clamping circuit may be employed in conjunction with other types of matrix amplifiers, including pentodes and solid-state devices. Furthermore, although R–Y, B–Y and G–Y color-control signals are produced by the illustrated chrominance demodulator, it is possible to generate other types of color-control signals without affecting the functioning of the invention.

The following are a set of component values for the illustrated circuits which have been found to provide satisfactory operation in accordance with the invention. It will be appreciated that these values are given by way of example, and that other values may be substituted therefore without departing from the principles of the present invention.

*V*18—25GP22A
*V*30, *V*31—6BV11
*L*37, *L*38—696 millihenries
C41, C42—33 micro-microfarads
R43, R44—22,000 ohms
C45, C46—0.05 microfarads
R47, R48—150 ohms
R49, R53, R56—5600 ohms
R50—1000 ohms
C51, C54, C57—0.01 microfarads
*V*52, *V*55, *V*58—6MJ8
R59, R60, R61,—1 megohm
R62—470 ohms
R63, R64, R65—27,000 ohms
R66, R67, R68—150,000 ohms
R72, R73, R74—100,000 ohms
C75, C76, C77—0.01 microfarads
T79—Type 2N4248
R83—1,000 ohms
R84—47,000 ohms
*B*+—390 volts While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a chrominance demodulator for a television receiver having a source of composite chrominance signals, sources of horizontal-rate and vertical rate retrace-interval pulses, a color image reproducer operable form first, second and third color-control signals, and a plane of reference potential:

means comprising a pair of synchronous detectors for deriving first and second color-information signals from said composite chrominance signal;

a matrixing impedance;

means AC coupled to said synchronous detecting means and comprising first, second and third matrix amplifier devices for selectively combining said first and second color-information signals to produce said first, second and third color-control signals for said image reproducer, each of said devices having an input electrode and an associated input circuit including a capacitor, an output electrode DC coupled to said image reproducer, and a common electrode returned to said plane of reference potential through said matrixing impedance;

means for establishing between said output and common electrodes of said matrix amplifier devices and through said matrixing impedance a quiescent operating current, said quiescent current developing across said matrixing impedance a source of direct current;

and means comprising a solid-state amplifying device operable from said developed direct current source and having an input electrode coupled to said source of horizontal-rate retrace-interval pulses, and to said source of vertical-rate retrace-interval pulses, said vertical-rate retrace-interval pulses being applied at an amplitude not greater than said horizontal-rate retrace-pulses, an output electrode coupled to one end terminal of said matrixing impedance and a common electrode coupled to the remaining end terminal of said matrixing impedance, for deriving operating power therefrom and for impressing said horizontal-rate pulses thereacross to cause said matrix amplifier devices to conduct and charge their respective input circuit capacitors during horizontal retrace intervals to establish DC reference levels in said devices and to provide both horizontal and vertical retrace-blanking to said image reproducer.

2. A chrominance demodulator as described in claim 1 wherein said output electrode of said solid-state amplifying device is coupled to the juncture of said matrixing impedance and said common electrodes of said matrix amplifier devices, and said common electrode of said solid-state device is returned to said plane of reference potential.

3. A chrominance demodulator as described in claim 2 wherein said matrix amplifiers are triode vacuum tubes whose input electrodes are control grids, whose output electrodes are anodes, and whose common electrodes are cathodes, said solid-state amplifying device is a transistor whose input electrode is a base, whose output electrode is a collector, and whose common electrode is an emitter, said matrixing impedance is a common cathode resistor, and said pulses are applied to said base with positive polarity and to said common cathode resistor with negative polarity.

4. In a chrominance demodulator for a television receiver having a source of composite chrominance signals, a source of horizontal retrace-interval pulses, a color image reproducer operable from first, second and third color-control signals, a reaction scanning type power supply for supplying accelerating potential to said image reproducer, a regulator circuit for varying said accelerating potential in response to an applied control effect, and a plane of reference potential:

means comprising a pair of synchronous detectors for deriving first and second color-information signals from said composite chrominance signal;

a matrixing impedance;

means AC coupled to said synchronous detecting means and comprising first, second and third matrix amplifier devices for selectively combining said first and second color-information signals to produce said first, second and third color-control signals for said image reproducer, each of said devices having an input electrode and an associated input circuit including a capacitor, an output electrode DC coupled to said image reproducer, and a common electrode returned to said plane of reference potential through said matrixing impedance;

means for establishing between said output and common electrodes of said matrix amplifier devices and through said matrixing impedance a quiescent operating current, said quiescent current developing across said matrixing impedance a source of direct current;

a solid-state amplifying device operable from said developed direct current source and having an output electrode coupled to one end terminal of said matrixing impedance, a common electrode coupled to the remaining end terminal, and an input electrode, said device exhibiting a unidirectional conduction characteristic between said input and common electrodes;

means including a coupling capacitor for applying said horizontal retrace-interval pulses to said input electrode of said amplifying device, said applied pulses causing said matrix amplifiers to conduct and establish DC reference levels in said circuit capacitors;

means connected to the junction of said capacitor and said input electrode for developing a DC control effect dependent on the amplitude of said pulses;

and means for applying said control effect to said regulator circuit to compensate for variations in said accelerating potential.